(12) United States Patent
Powell et al.

(10) Patent No.: US 7,495,833 B2
(45) Date of Patent: Feb. 24, 2009

(54) SCANNED BEAM SOURCE AND SYSTEMS USING A SCANNED BEAM SOURCE FOR PRODUCING A WAVELENGTH-COMPENSATED COMPOSITE BEAM OF LIGHT

(75) Inventors: Karlton D. Powell, Lake Stevens, WA (US); Amjad Malik, Bothell, WA (US); Christopher A. Wiklof, Everett, WA (US)

(73) Assignee: Microvision, Inc., Redmond, WA (US)

( * ) Notice: Subject to any disclaimer, the term of this patent is extended or adjusted under 35 U.S.C. 154(b) by 219 days.

(21) Appl. No.: 11/710,587

(22) Filed: Feb. 23, 2007

(65) Prior Publication Data

US 2007/0242327 A1 Oct. 18, 2007

Related U.S. Application Data

(60) Provisional application No. 60/775,887, filed on Feb. 23, 2006.

(51) Int. Cl.
G02B 27/10 (2006.01)
(52) U.S. Cl. .................. 359/618; 359/626; 359/634
(58) Field of Classification Search ......... 359/618–630, 359/13, 197–226
See application file for complete search history.

(56) References Cited

U.S. PATENT DOCUMENTS

| 6,243,186 B1 | 6/2001 | Melville |
| 6,245,590 B1 | 6/2001 | Wine et al. |
| 6,624,949 B2 * | 9/2003 | Roddy et al. ............... 359/634 |
| 2005/0025026 A1 * | 2/2005 | Hirai ...................... 369/112.02 |
| 2005/0116038 A1 * | 6/2005 | Lewis et al. ................ 235/454 |
| 2006/0018234 A1 * | 1/2006 | Sugi et al. .............. 369/112.01 |

FOREIGN PATENT DOCUMENTS

| KR | 1020010005507 | 1/2001 |
| KR | 1020020057981 | 7/2002 |
| WO | WO 2005/078506 | 8/2005 |

* cited by examiner

Primary Examiner—Ricky L Mack
Assistant Examiner—Vipin M Patel
(74) Attorney, Agent, or Firm—Kevin D. Wills

(57) ABSTRACT

According to embodiments, scanned beam source may include a first beam shaping optical element aligned to receive a composite beam of light carrying a plurality of wavelength components and a second beam shaping optical element aligned to receive the composite beam of light from the first beam shaping optical element and configured to modify the first plurality of wavelength components of the composite beam to a plurality of dimensions proportional to wavelength. The first beam shaping optic may be, for example, a top-hat converter. The second beam-shaping optic may be, for example, a polarization-sensitive clipping aperture, a wavelength-dependent clipping aperture, and/or an achromatic corrector.

31 Claims, 16 Drawing Sheets

TOP HAT LENS DETAILS-RG BALANCED

R1= 3.947797 CONCAVE    R2= 4.033526 CONVEX
MATERIAL= ZEONEX E48R    CT= 3.00mm
CA= 1.75mm DIAMETER    EXTENDED ASPHERE N= 12

| | COEFF. ON $\rho^2$ | COEFF. ON $\rho^4$ | COEFF. ON $\rho^6$ | COEFF. ON $\rho^8$ | COEFF. ON $\rho^{10}$ | COEFF. ON $\rho^{12}$ |
|---|---|---|---|---|---|---|
| S1- CONCAVE | -0.162324 | 0.293400 | -0.121105 | -0.271123 | 1.835276 | -3.885563 |
| S2- CONVEX | -0.056655 | 0.044824 | 0.025631 | -0.022724 | 0.090473 | -0.069230 |
| | COEFF. ON $\rho^{14}$ | COEFF. ON $\rho^{16}$ | COEFF. ON $\rho^{18}$ | COEFF. ON $\rho^{20}$ | COEFF. ON $\rho^{22}$ | COEFF. ON $\rho^{24}$ |
| S1- CONCAVE | -1.855089 | -4.088348 | 2.652863 | -7.791209 | -10.995649 | -4.161976 |
| S2- CONVEX | -0.129606 | 0.285586 | 0.265413 | -0.572560 | -0.225296 | 0.473799 |

SAG OF THE SURFACE IS GIVEN BY THE FOLLOWING EXPRESSION:

$$z = \frac{cr^2}{1+\sqrt{1-(1+k)c^2r^2}} + \sum_{i=1}^{N} \alpha_i \rho^{2i},$$

WHERE c IS THE CURVATURE (THE RECIPROCAL OF THE RADIUS), r IS THE RADIAL COORDINATE IN LENS UNITS AND k IS THE CONIC WHERE THE FIRST EXPRESSION IS IDENTICAL TO THE STANDARD SURFACE, AND THE SECOND TERM IS A POWER SERIES SUM OVER A NORMALIZED RADIAL COORDINATE

*FIG. 6*

RG TOP HAT PROFILE ACHIEVED - Δ1%

WAVELENGTH 0.53000 μm IN INDEX 1.00000 AT 0.0000, 0.0000 DEG
CENTER, X= 0.0000E+000
PEAK IRRADIANCE = 2.6003E-001 WATTS/ MILLIMETRES^2,
TOTAL POWER = 9.0032E-001 WATTS
PILOT: SIZE=1.0391E+000. WAIST= 3.2464E-001. PDS= -1.8990E+003.
RAYLEIGH= 6.2431E+002

WAVELENGTH 0.63800 μm IN INDEX 1.00000 AT 0.0000, 0.0000 DEG
CENTER, X= 0.0000E+000
PEAK IRRADIANCE = 2.6049E-001 WATTS/ MILLIMETRES^2,
TOTAL POWER = 9.0032E-001 WATTS
PILOT: SIZE=1.0376E+000. WAIST= 1.0365E+000. PDS= 2.3418E+002.
RAYLEIGH= 5.2904E+003

THE NA CONVERTER IS AN AIR SPACED DOUBLET

TWO LENS STACK

LENS 1: R1 = - 45.09091mm     R2 = 28.65715mm
      MATERIAL: SCHOTT SF11     CT = 1.0mm

AIR SPACE DISTANCE = 1.00mm

LENS 2: R1 =72.94631mm     R2 = -13.14885mm
      MATERIAL: SCHOTT BK7     CT = 3.0mm

FOCAL LENGTH =143.8mm

*FIG. 14*

SCANNED BEAM SOURCE AND SYSTEMS USING A SCANNED BEAM SOURCE FOR PRODUCING A WAVELENGTH-COMPENSATED COMPOSITE BEAM OF LIGHT

CROSS-REFERENCE TO RELATED APPLICATIONS

This application claims priority from and incorporates by reference herein U.S. Provisional Patent Application Ser. No. 60/775,887, entitled LIGHT SOURCE MODULE AND SYSTEMS USING A LIGHT SOURCE MODULE FOR PRODUCING A MULTI-COLOR BEAM HAVING WAVELENGTH-DEPENDENT SIZE, invented by Karlton Powell et al., applied for on Feb. 23, 2006.

BACKGROUND

Scanned beam displays may be used to project images such as video images for viewing. Some scanned beam displays may include a screen against which light is projected, such as by front- or rear-projection, to form an image. Other scanned beam displays may project light, such as through relay optics, onto the retina of a viewer to form an image.

It may be desirable in some applications to expand the exit pupil of a scanned beam image. This may be done, for example, to improve coupling of the image into the eye in applications where there may be relative movement between the scanned beam display and the eye of the viewer. An optional beam expander may be operable to enlarge the region over which a viewer may see the image. Beam expanders may be formed from refractive, diffractive, and reflective elements.

Scanned beam imagers may be used to collect images including still and/or video images.

OVERVIEW

One aspect according to an embodiment relates to methods and apparatuses for improving the uniformity of a scanned beam image formed within an exit pupil or viewing region.

According to an embodiment, beam forming optical elements may be coupled individually to shape a plurality of beams or groups of beams having a plurality of characteristic wavelengths that are subsequently scanned to form an image. According to some embodiments, the shaped beams may be combined in a beam combiner prior to launching a resultant composite beam comprised of the plurality of wavelengths toward a scanner.

According to an embodiment, beams or groups of beams may be combined into a composite beam having a plurality of wavelengths prior to shaping the composite beam. The shaped composite beam may then be scanned to form an image.

According to an embodiment, the properties of one or more beam shaping optical elements are selected to shape a composite beam having a plurality of characteristic wavelengths. According to embodiments, the selected properties may be wavelength-dependent and may be operable to compensate for wavelength-dependent behavior of at least one other optical element. The shaped composite beam may be scanned to form an image.

According to an embodiment, beams or groups of beams may be combined into a composite beam having a plurality of characteristic wavelengths, the composite beam then shaped by beam shaping optics, and the shaped composite beam then refracted or diffracted by one or more wavelength-dependent optical compensation elements operable to compensate for wavelength-dependent behavior of the beam shaping optics and/or at least one other optical element. The shaped and compensated composite beam may be scanned to form an image.

According to an embodiment, a composite beam of light containing a plurality of wavelengths may be shaped to provide differing dimensions for differing wavelengths. For example, a composite beam containing red, green, and blue wavelength components may be shaped to provide a different beam diameter or numerical aperture for each of the red, green, and blue components. According to an embodiment, the diameter or numerical aperture of each of the components may be made proportional to wavelength; the blue wavelength component having the smallest diameter or numerical aperture, the green wavelength component having an intermediate diameter or numerical aperture, and the red wavelength component having the largest diameter or numerical aperture.

According to an embodiment, a wavelength-dependent clipping aperture may be formed. A composite beam of light, containing a plurality of wavelength components may be passed through the wavelength-dependent clipping aperture to provide differing beam diameters for at least two of the wavelength components.

According to an embodiment, a wavelength-dependent clipping aperture may be formed from a polarization-dependent clipping aperture. For example a longer wavelength component of a composite beam of light may be formed to have one polarization state, and a shorter wavelength component of a composite beam may be formed to have another polarization state. The polarization dependency of the clipping aperture may be configured to provide differing diameters for the polarization states, and hence for the wavelength components.

According to an embodiment, a composite beam of light carrying a plurality of wavelength components having a plurality of diameters may be scanned across an exit pupil expander. The exit pupil expander may be configured to produce a plurality of far field beamlets, the composite effect of the beamlets being to enlarge exit pupil, or viewing region over which an image is visible. The diameters of the wavelength components may be selected to compensate for varying amounts of diffraction or refraction experienced by the wavelength components as they pass through the exit pupil expander. According to an embodiment, longer wavelength components may undergo more diffraction or refraction than shorter wavelength components, tending to spread out the far field beamlets of the longer wavelength components more than the far field beamlets of the shorter wavelength components. Hence, the shorter wavelength components may be shaped to have smaller diameters relative to longer wavelength components. The smaller diameters of the shorter wavelength components may be selected to provide substantially the same amount of overlap (or lack of overlap) between far field beamlets comprising the shorter wavelength components as the amount of overlap (or lack of overlap) produced between the far field beamets comprising the longer wavelength components.

According to other embodiments, wavelength dependent spot size in a scanned beam imager may be selected or compensated for by wavelength-dependent beam shaping optics and/or wavelength-dependent compensation optics. The scanned beam imager may include various systems such as a laser camera, bar code scanner, and medical imagers such as a scanned beam endoscope or scientific imaging apparatuses.

BRIEF DESCRIPTION OF THE DRAWINGS

FIG. 6 is a presentation of the principal design parameters of the top hat converter lens shown in FIG. 5 according to an embodiment.

FIG. 14 is a presentation of the principal design parameters of the corrector doublet shown in FIG. 13 according to an embodiment.

DETAILED DESCRIPTION

Figure 1:
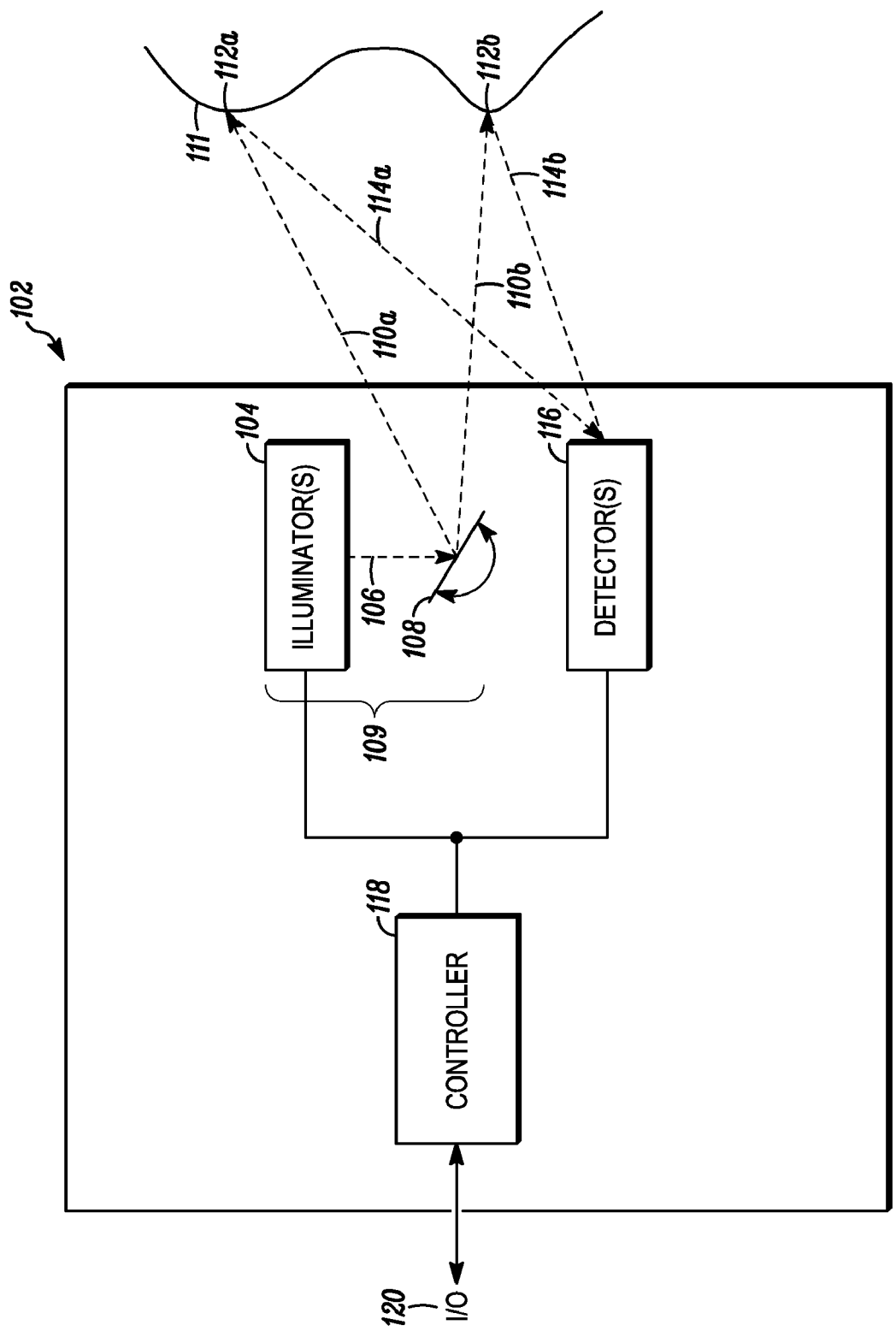
FIG. 1 is a block diagram of the principal components of a scanned beam image capture device according to an embodiment.

FIG. 1 is a block diagram of the principal components of a scanned beam image capture device 102 according to an embodiment.

A light source module (LSM) 104 creates a first beam of light 106. A scanner 108 deflects the first beam of light across a field-of-view (FOV) to produce a second scanned beam of light 110, shown in two positions 110a and 110b. The scanned beam of light 110 sequentially illuminates spots 112 in the FOV, shown as positions 112a and 112b, corresponding to beam positions 110a and 110b, respectively. While the beam 110 illuminates the spots 112, the illuminating light beam 110 is reflected, absorbed, scattered, refracted, or otherwise affected by the properties of the object or material to produced scattered light energy. A portion of the scattered light energy 114, shown emanating from spot positions 112a and 112b as scattered energy rays 114a and 114b, respectively, travels to one or more detectors 116 that receive the light and produce electrical signals corresponding to the amount of light energy received. The electrical signals drive a controller 118 that builds up a digital image and transmits it for further processing, decoding, archiving, printing, display, or other treatment or use via interface 120.

The LSM 104 may include multiple emitter types such as, for instance, light emitting diodes (LEDs), lasers, thermal sources, arc sources, fluorescent sources, gas discharge sources, or other types of illuminators. In some embodiments, LSM 104 comprises a red laser diode having a wavelength of approximately 638 nanometers (nm) and a green diode-pumped solid state (DPSS) laser having a wavelength of approximately 530 nm. In another embodiment, LSM 104 comprises three lasers; a red diode laser, a green diode-pumped solid state (DPSS) laser, and a blue DPSS laser at approximately 635 nm, 532 nm, and 473 nm, respectively. While laser diodes may be directly modulated, DPSS lasers generally require external modulation such as an acousto-optic modulator (AOM) for instance. In the case where an external modulator is used, it is considered part of the LSM 104. LSM 104 may include, in the case of multiple emitters, beam combining optics to combine some or all of the emitters into a single beam. LSM 104 may also include beam-shaping optics such as one or more collimating lenses and/or apertures. Additionally, while the wavelengths described in the previous embodiments have been in the optically visible range, other wavelengths may be within the scope of embodiments of the invention.

Light beam 106, while illustrated as a single beam, may comprise a plurality of beams converging on a single scanner 108 or onto separate scanners 108.

Some embodiments use a MEMS scanner. A MEMS scanner may be of a type described in, for example; U.S. Pat. No. 6,140,979, entitled SCANNED DISPLAY WITH PINCH, TIMING, AND DISTORTION CORRECTION and commonly assigned herewith; U.S. Pat. No. 6,245,590, entitled FREQUENCY TUNABLE RESONANT SCANNER AND METHOD OF MAKING and commonly assigned herewith; U.S. Pat. No. 6,285,489, entitled FREQUENCY TUNABLE RESONANT SCANNER WITH AUXILIARY ARMS and commonly assigned herewith; U.S. Pat. No. 6,331,909, entitled FREQUENCY TUNABLE RESONANT SCANNER and commonly assigned herewith; U.S. Pat. No. 6,362,912, entitled SCANNED IMAGING APPARATUS WITH SWITCHED FEEDS and commonly assigned herewith; U.S. Pat. No. 6,384,406, entitled ACTIVE TUNING OF A TORSIONAL RESONANT STRUCTURE and commonly assigned herewith; U.S. Pat. No. 6,433,907, entitled SCANNED DISPLAY WITH PLURALITY OF SCANNING ASSEMBLIES and commonly assigned herewith; U.S. Pat. No. 6,512,622, entitled ACTIVE TUNING OF A TORSIONAL RESONANT STRUCTURE and commonly assigned herewith; U.S. Pat. No. 6,515,278, entitled FREQUENCY TUNABLE RESONANT SCANNER AND METHOD OF MAKING and commonly assigned herewith; U.S. Pat. No. 6,515,781, entitled SCANNED IMAGING APPARATUS WITH SWITCHED FEEDS and commonly assigned herewith; and/or U.S. Pat. No. 6,525,310, entitled FREQUENCY TUNABLE RESONANT SCANNER and commonly assigned herewith; all hereby incorporated by reference.

According to some embodiments, a 2D MEMS scanner 108 scans one or more light beams at high speed in a pattern that covers an entire 2D FOV or a selected region of a 2D FOV within a frame period. A typical frame rate may be 60 Hz, for example. It may be advantageous to run one or both scan axes resonantly. In one embodiment, one axis is run resonantly at about 19 KHz while the other axis is run non-resonantly in a sawtooth pattern so as to create a progressive scan pattern. A progressively scanned bi-directional approach with a single beam scanning horizontally at scan frequency of approximately 19 KHz and scanning vertically in sawtooth pattern at 60 Hz can approximate an SVGA resolution. In one such system, the horizontal scan motion is driven electrostatically and the vertical scan motion is driven magnetically. Alternatively, both the horizontal and vertical scan may be driven magnetically or capacitively. Electrostatic driving may include electrostatic plates, comb drives or similar approaches. In various embodiments, both axes may be driven sinusoidally or resonantly.

Alternatively, the scanner 108 may be driving in one axis, such as in an embodiment of a 1D bar code scanner, for example. According to other embodiments, the scanner 108 may be comprised of plural scanning devices of similar or different designs. Plural devices may be used, for example, in a manner where one physical scanning mirror provides scanning in one axis and at least one second physical scanning mirror provides scanning in at least one second axis. Alternatively, plural devices may be used to provide scanning over a greater scanning angle in a single axis. For ease of understanding, embodiments using a plurality of scanning devices will be referred to herein as scanner 108.

Several types of detectors may be appropriate, depending upon the application or configuration. For example, in one embodiment, the detector may include a simple PIN photodiode connected to an amplifier and digitizer. In this configuration, beam position information may be retrieved from the scanner or, alternatively, from optical mechanisms, and image resolution is determined by the size and shape of scanning spot 112. In the case of multi-color imaging, the detector 116 may comprise more sophisticated splitting and filtering to separate the scattered light into its component parts prior to detection. As alternatives to PIN photodiodes, avalanche photodiodes (APDs) or photomultiplier tubes (PMTs) may be preferred for certain applications, particularly low light applications.

In various approaches, simple photodetectors such as PIN photodiodes, APDs, and PMTs may be arranged to stare at the entire FOV, stare at a portion of the FOV, collect light retro-collectively, or collect light confocally, depending upon the application. In some embodiments, the photodetector 116 collects light through filters to eliminate much of the ambient light.

The present device may be embodied as monochrome, as full-color, and even as a hyper-spectral. In some embodiments, it may also be desirable to add color channels between the conventional RGB channels used for many color cameras. Herein, the term grayscale and related discussion shall be understood to refer to each of these embodiments as well as other methods or applications within the scope of the invention. In the control apparatus and methods described below, pixel gray levels may comprise a single value in the case of a monochrome system, or may comprise an RGB triad or greater in the case of color or hyperspectral systems. Control may be applied individually to the output power of particular channels (for instance red, green, and blue channels) or may be applied universally to all channels.

In some embodiments, the LSM may emit a polarized beam of light or a separate polarizer (not shown) may be used to polarize the beam. In such cases, the detector 116 may include a polarizer cross-polarized to the scanning beam 110. Such an arrangement may help to improve image quality by reducing the impact of specular reflections on the image.

Figure 2:
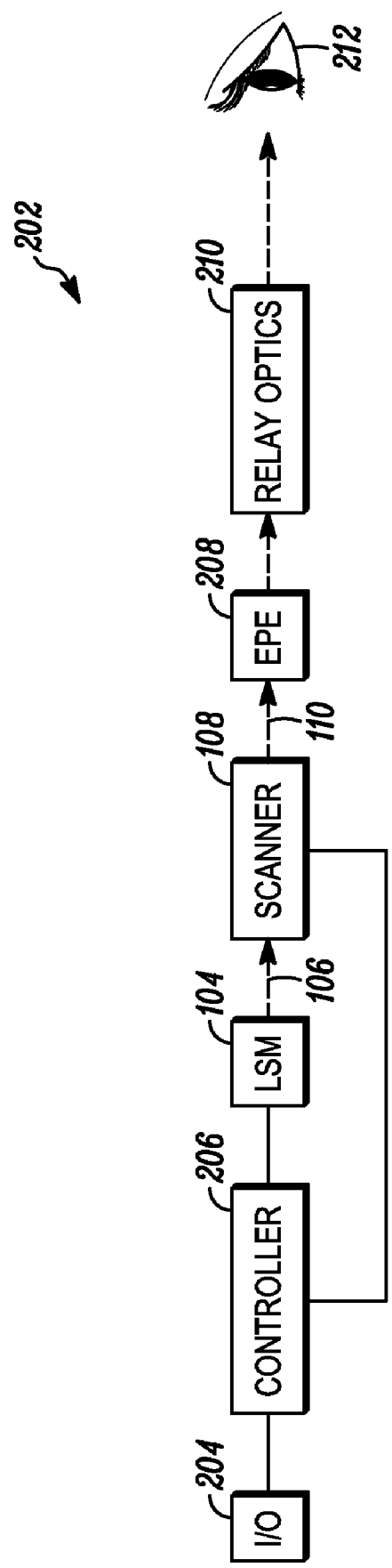
FIG. 2 is a block diagram of the principal components of a scanned beam display adapted to project an image into the eye of a viewer according to an embodiment.

FIG. 2 is a block diagram of some of the principal components of a scanned beam display 202 adapted to project an image into the eye of a viewer 212 according to an embodiment. An interface 204 may receive a signal corresponding to an image from a video or image source or alternatively may recall an image from memory. The signal is then received by a controller 206 that is functionally coupled to a light source module 104 and a beam scanner 108. The controller controls modulation of the light output from the light source module to produce modulated first beam 106 while controlling or detecting the position of the beam scanner 108. The controller modulates the intensity of particular wavelengths produced by the LSM 104 in synchronization with the position of the deflected beam 110 to produce a scanned beam having a power modulation corresponding to the position of pixels in the received input image.

The scanned beam 110 may be scanned across an exit pupil expander (EPE) 208 that is operative to expand the size of the exit pupil. Various approaches may be used to construct an EPE including a diffractive plate, a microlens array (MLA), a dual microlens array (DMLA), etc. Generally speaking, the exit pupil expander is operative to cause the emission of diffraction orders across a range of angles from the front (viewed) surface of the EPE. The diffraction orders greater than the $0^{th}$ order expand the size of the exit pupil.

The pattern of light from the EPE may be transferred through relay optics 210 to the eye of a viewer 212.

The relay optics 210 may be configured to provide a see-through image, such that the viewer 212 is able to simultaneously see the projected image and real world objects through the projected image. Alternatively, the relay optics 210 may be configured to provide an occluded image wherein the viewer 212 may view the projected image without simultaneously seeing real world objects through the projected image. The accommodation of the system may be adjusted by the relay optics 210 to provide an apparent image that appears near or far away to the viewer 212.

Considerations and approaches to constructing the principal elements of the system 202 may be similar to those for constructing the principal elements of the system 102 of FIG. 1. In the interest of brevity, those considerations and approaches will not be repeated in detail.

Figure 3:
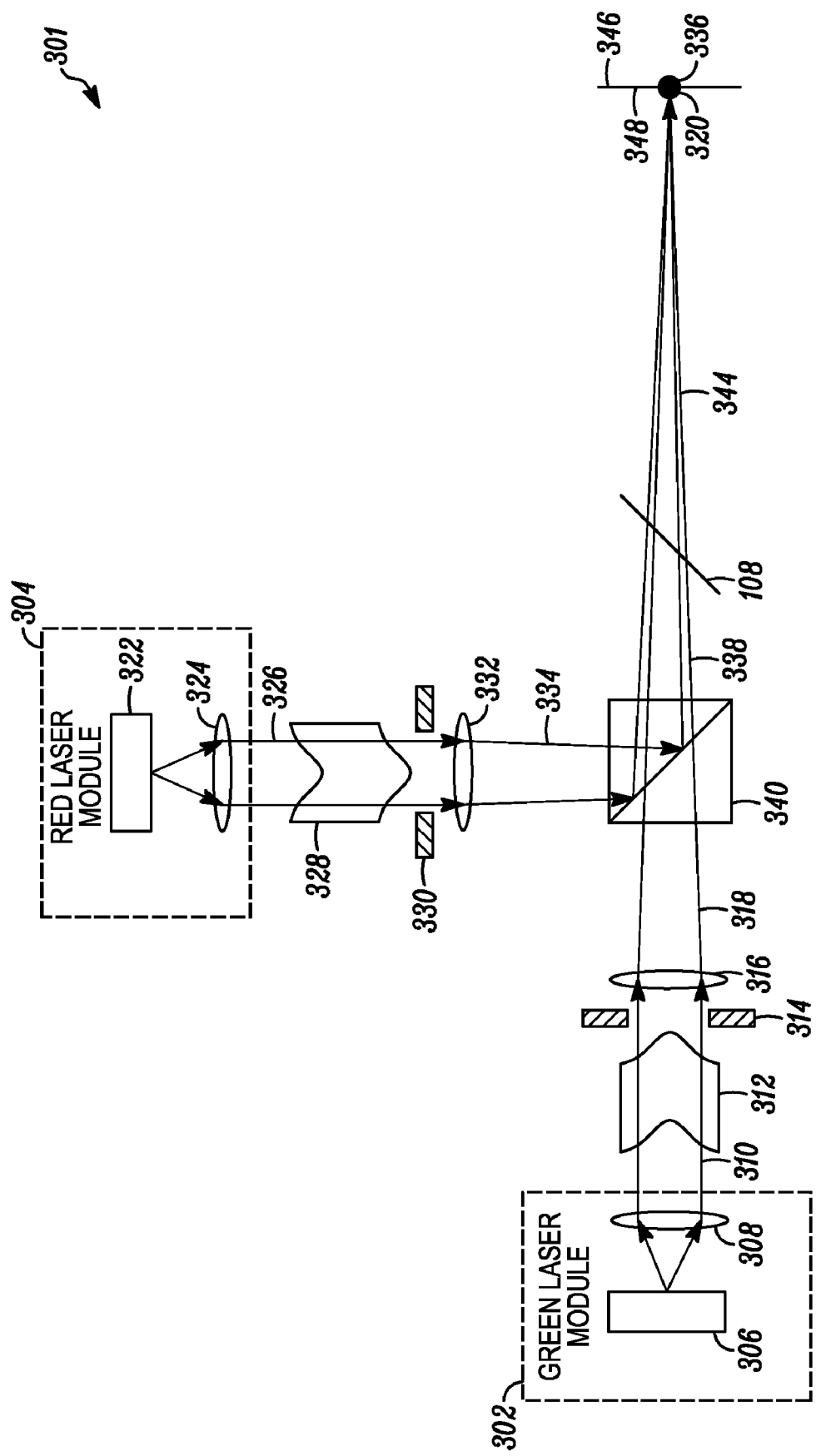
FIG. 3 is a schematic diagram of a two-color scanned beam source including beam shaping prior to combining the beams into a composite beam according to an embodiment.

FIG. 3 is a schematic diagram of a two-color scanned beam source 301 including beam shaping prior to combining the beams into a composite beam, according to an embodiment. The embodiment 301 of FIG. 3 includes dual channel light source modules that include discrete green and red laser modules, 302 and 304, respectively.

The green laser module 302 may include a green laser 306 and a collimating lens 308 operable to emit a collimated beam of green light 310. A first beam shaping optical element 312 may comprise a top-hat optic configured to redistribute the power density profile of the beam 310 from a substantially Gaussian profile to a top-hat profile. A green clipping aperture 314 may select a diameter of the green beam 310 appropriate to meet system preferences. The collimated, shaped, and clipped green beam 310 may then be focused by a green focusing optical element 316 to produce a focused green beam 318 having a green focused spot 320.

Similarly, the red laser module 304 may include a red laser 322 and a collimating lens 324 operable to emit a collimated beam of red light 326. A first beam shaping optical element 328 may comprise a top-hat optic configured to redistribute the power density profile of the beam 326 from a substantially Gaussian profile to a top-hat profile. A red clipping aperture 330 may select a diameter of the red beam 326 appropriate to meet system preferences. The collimated, shaped, and clipped red beam 326 may then be focused by a red focusing optical element 332 to produce a focused red beam 334 having a red focused spot 336.

The focused green and red beams 318, 334 may be combined into a composite beam 338 carrying red and green wavelength components by a beam combiner 340. Thus, the green and red focused spots 320, 336 may be formed at a superimposed location as indicated. The focused composite beam 338 may be scanned by a beam scanner 108, such as a MEMS scanner described above, to produce a scanned beam 344. The scanned beam 344 may periodically scan the composite beam 338 across an intermediate image plane 346 that may be an exit pupil expander 348.

According to an embodiment, the green clipping aperture 314 and the red clipping aperture 330 may be configured to produce respective beam diameters that are proportional to wavelength. For example, for a green wavelength of 532 nanometers and a red wavelength of 635 nanometers, the red clipping aperture (and/or alternative optical components) may form a spot 336 that is superimposed over and 1.19 times the diameter of the green spot 320 (635/532=~1.19). As will be explained in more detail below, the exit pupil expander 348 may then diffract or refract the red wavelength component of the scanned composite beam 344 about 1.19 times more than the green wavelength component of the scanned composite beam to produce far field beamlets (not shown) having differing spacing, e.g. red component far field beamlets being spaced 1.19 times farther apart than green component far field beamlets. However, the 1.19 times greater diameter of the resultant red component far field beamlets offsets the 1.19 times greater spacing to result in both the green and red far field beamlets having substantially equal fill factors, and hence similar apparent uniformity to a viewer (not shown).

As was discussed above, the green laser module 302 and red laser module 304 may be modulated by a controller (not shown) corresponding to a video image that, in cooperation with the scanner 108, results in a video image being visible to the viewer.

When the beam shaping optical elements 312, 328 are top hat converters, the composite beam may convolve to a sinc beam at its focus point 346, and then convolve back to top hat beamlets (not shown) in the far field. Top hat beamlets in the far field that are at respective wavelength-dependent diameters substantially equal to beamlet spacing, may provide an especially uniform video image to the viewer (not shown) as the position of the viewer varies within the viewing region or exit pupil. That is, peaks in output intensity corresponding to the peaks of a Gaussian energy profile may be substantially absent and the relatively constant power across neighboring top hat beamlets may be substantially imperceptible as the viewing position varies.

Figure 4:
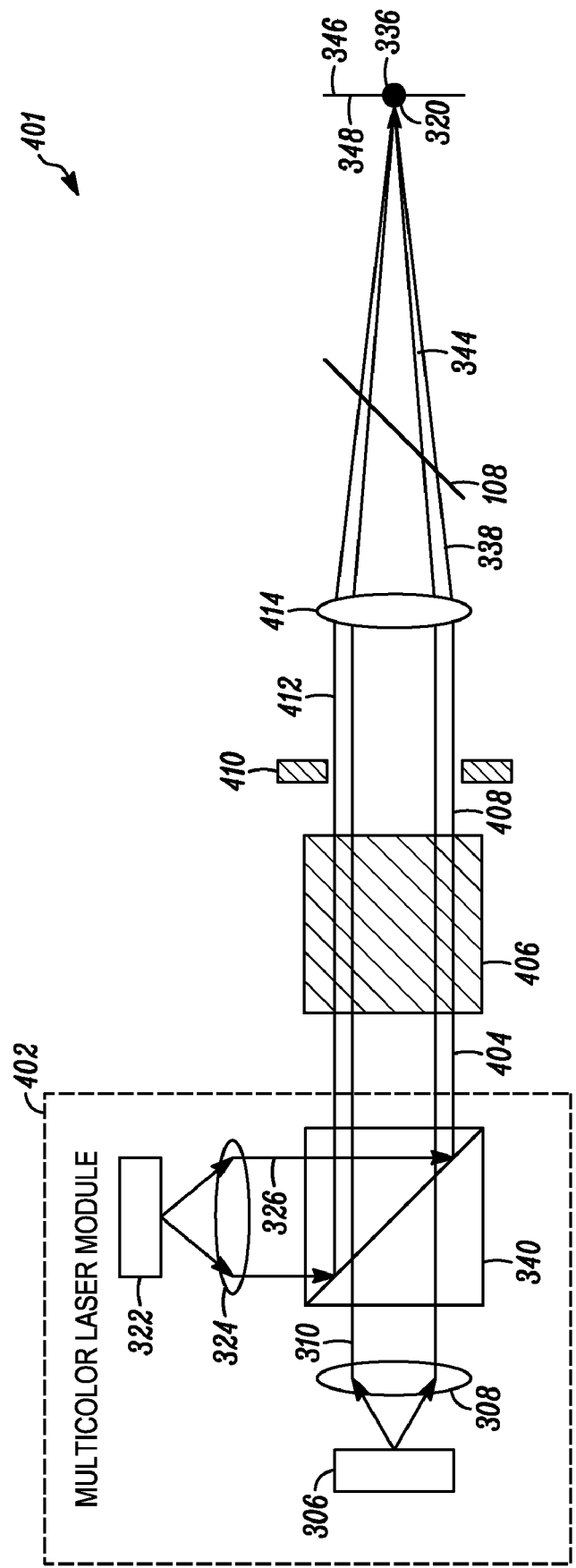
FIG. 4 is a schematic diagram of a two-color scanned beam source including beam combining prior to beam shaping of the resultant composite beam according to an embodiment.

FIG. 4 is a schematic diagram of a two-color scanned beam source 401 including beam combining prior to beam shaping of the resultant composite beam according to an embodiment. A two channel scanned beam source 402 may include a green laser light source 306 operable to emit a beam of green light through a green collimating lens 308 to produce a green collimated beam 310. Similarly, the two channel light source module 402 may include a red laser light source 322 operable to emit a beam of red light through a red collimating lens 324 to produce a red collimated beam 326. The green and red collimated beams 310, 326 may be combined by a beam combiner 340 to produce a collimated composite beam of light 404 comprised of green and red wavelength components. Beam shaping optics 406 may then shape the received beam. For example, the beam shaping optics may comprise a top hat converter configured to redistribute the power density profile of the composite beam 404 from a substantially Gaussian profile to an output beam 408 having a substantially top-hat profile. In the embodiment 401, the beam shaping optic may be designed to be substantially pan-chromatic to convert the energy distribution of the differing wavelength components of the composite beam 404 into energy distributions within the output beam 408 that are substantially similar to one another.

The composite beam 408 may then be passed through a wavelength-dependent or polarization dependent aperture 410 that is configured to impart differing diameters on the wavelength components of the composite beam.

For example, a green clipping aperture component of the wavelength-dependent aperture 410 and the red clipping aperture component of the wavelength dependent aperture may be configured to comprise diameters that are proportional to wavelength. As in the example above, for a green wavelength of 532 nanometers and a red wavelength of 635 nanometers, the red clipping aperture component of the wavelength-dependent clipping aperture 410 may be 1.19 times the diameter of the green clipping aperture component (635/532=~1.19).

According to an alternative embodiment, the wavelength-dependent clipping aperture may be formed as separate, discrete components, and the superposition of the apertures being made by passing the composite beam through the separate components sequentially.

The composite beam 412 formed by the preceding components, may carry wavelength components that are superimposed, but having differing diameters corresponding to their respective clipping aperture component sizes. The composite beam 412 may be focused by a focusing lens 414 to form a focused composite beam 338. The focused composite beam 338, as above, may be scanned by a beam scanner 108 to form a composite scanned beam 344 and may be focused to form superimposed green and red spots 320, 336 at a focal plane or curve 346, where an exit pupil expander 348 may be placed. As described above, the green laser 306 and red laser 322 may be modulated by a controller (not shown) corresponding to a video image that, in cooperation with the scanner 108, results in a video image being visible to the viewer. When the beam shaping optical element 406 is a top hat converter, the composite beam may convolve to a sinc beam at its focus point 346, and then convolve back to top hat beamlets (not shown) formed by the exit pupil expander 348 in the far field. According to an embodiment, top hat beamlets in the far field that are at respective wavelength-dependent diameters substantially equal to beamlet spacing, may provide an especially uniform video image to the viewer (not shown) as the position of the viewer varies within the viewing region or exit pupil.

According to some embodiments, the system of FIG. 4 may be constructed using a single multicolor laser module such as may be supplied by OSRAM or another multicolor laser module manufacturer. Such an approach may result in reduction of size of the overall scanned beam source package, simplify tooling and alignment procedures at final assembly, and/or reduce the number of required discrete optical elements, according to various embodiments.

Figure 5:
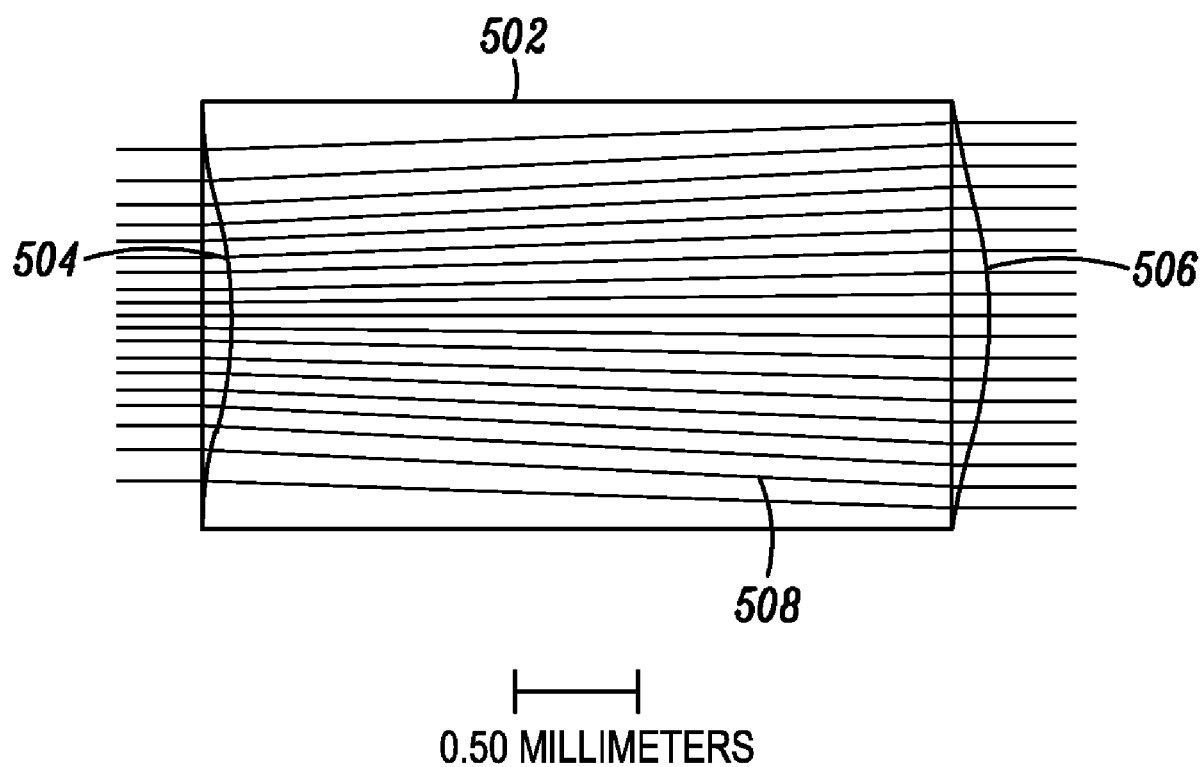
FIG. 5 is a diagram of a top hat converter lens including ray traces for two colors according to an embodiment.

FIG. 5 is a diagram of a single-element top hat converter lens 502 including aspherical input and output surfaces 504, 506 and ray traces 508 for green and red wavelength components, according to an embodiment. The lens 502 is designed to be a wavelength-balanced lens, and hence the ray traces 508 for plural wavelength components may be substantially superimposed as shown. As described above, according to an embodiment that uses a top hat converter lens 502, red and green beam profiles are converted from Gaussian to a top hat profile.

Some parameters of an embodiment that may use the top hat converter lens of FIG. 5 include: two wavelengths including red @ 638 nm and green @ 530 nm, Gaussian input beam intensity profiles, red and green are pre-collimated, circular input beam diameters=1.75 mm $FWe^2$, top hat design point for 90% efficiency, circular clipping aperture used for analysis efficiency, and a system optimized for an optical path length corresponding to an automotive heads-up display (HUD). Alternatively, additional wavelengths may be used, input and output intensity profiles may be varied, the input wavelengths may not be pre-collimated, input beam shapes may be other than circular and may be other than the indicated diameter, a different efficiency design point may be used, other clipping aperture shapes may be used, the optical path length may correspond to other applications, and/or the top hat converter lens may be comprised of multiple elements such as one or more spherical and/or one or more aspherical elements.

FIG. 6 is a presentation of the principal design parameters 601 including dimensions of the top hat converter lens shown in FIG. 5 according to an embodiment.

Figure 7A:
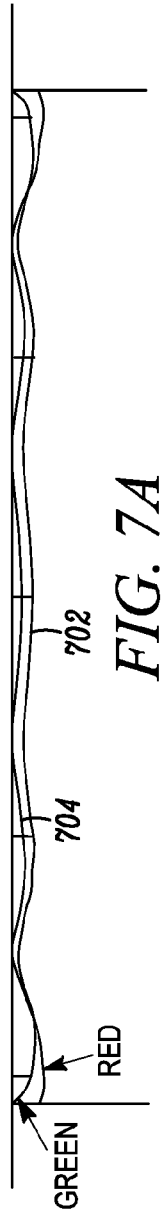
FIG. 7A includes intensity profiles for green and red beams projected through the top hat converter lens of FIG. 5, according to an embodiment
Figure 7B:
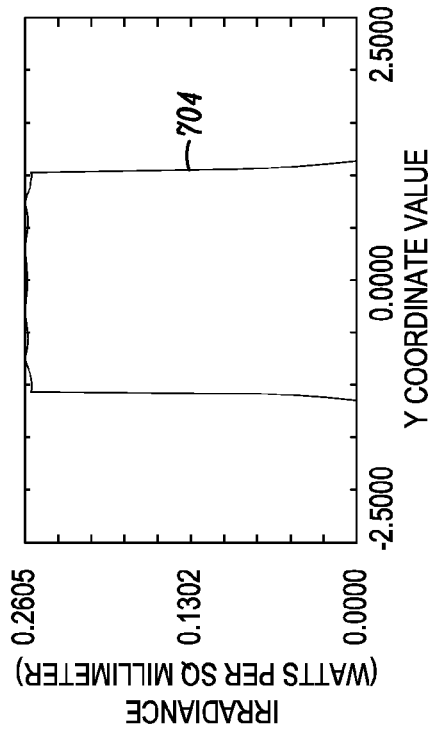
FIG. 7B shows the intensity profile of the red wavelength component of FIG. 7A, according to an embodiment.
Figure 7C:
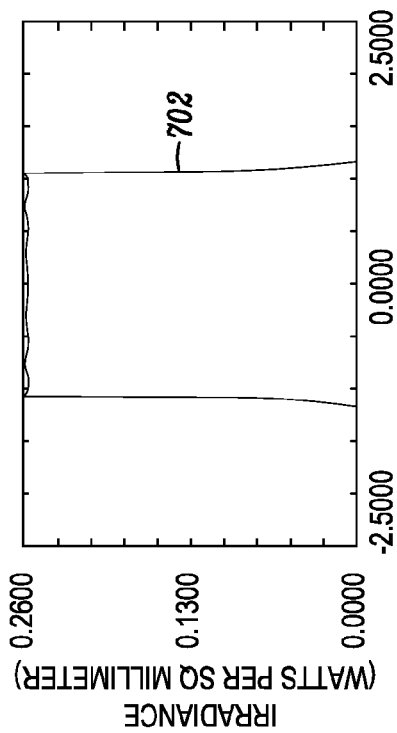
FIG. 7C shows the intensity profile of the green wavelength component of FIG. 7A, according to an embodiment.

As mentioned above, the first beam-shaping optical element may be selected to provide top hat output intensity profiles of two or more wavelengths that are substantially identical. FIG. 7A includes superimposed intensity profiles, 702 and 704, respectively, that were measured according to an embodiment for green and red beams projected through the top hat converter lens shown in FIG. 5. FIG. 7B shows the intensity profile 704 of the red wavelength component alone. FIG. 7C shows the intensity profile 702 of the green wavelength component alone. It may be seen that the converter lens shown in FIG. 5, whose design parameters are as per FIG. 6, achieved relatively uniform top hat profiles between the given wavelengths. Alternative embodiments may be used to convert additional or different wavelengths of the electromagnetic spectrum from Gaussian to top hat profiles.

As discussed above, according to embodiments of an exit pupil expander (EPE), the amount of output path deviation from the $0^{th}$ order may depend on wavelength. Thus, for differing wavelengths, the spacing or pitch between beamlets in the far field may be different. Generally, longer wavelengths may produce beamlets having greater separation and shorter wavelengths may produce beamlets having less separation. Differences in beamlet spacing may be compensated for by making the far field beamlets different in size, with size corresponding to the spacing between beamlets. The ratio of relative beamlet size and spacing may be referred to as fill factor. A fill factor greater than one indicates that the beamlet diameter is larger than the beamlet spacing. A fill factor less than one indicates that the beamlet diameter is less than the beamlet spacing.

According to embodiments, the far field beamlet size is proportional to the scanning beam spot size on the EPE. Thus, a smaller scanning beam spot size on the EPE may produce a smaller far field beamlet size, and conversely a larger scanning beam spot size on the EPE may produce a larger far field beamlet size. For composite beams having a plurality of wavelength components, the scanning beam spot size, and hence the far field beamlet size, may be configured to be varied individually (or alternatively as groupings) for the wavelength components.

As described above, the spacing between beamlets produced by an EPE in the far field may be proportional to wavelength. According to some embodiments, it is desirable to maintain a fill factor close to one for each wavelength component in the beamlets in the far field. Thus, according to embodiments, the spot size of the scanning beam at the EPE may also be made proportional to wavelength, an arrangement that may be used to provide substantially equal fill factors for the plurality of wavelength components. According to embodiments, the size of the scanning spot of the various wavelength components of a scanning composite beam at the EPE may be selected to produce a fill factor close to one for each wavelength component in the far field. As described above, according to embodiments, the size of the scanning spot of each of the wavelength components is proportional to the diameter of the wavelength component when launched toward the EPE. The size of the diameter of the wavelength component launched toward the EPE divided by the distance to the EPE may be referred to as the numerical aperture (NA) of the wavelength component.

According to embodiments, various approaches may be used to produce differing NAs between wavelength components of a composite beam. According to one embodiment, a wavelength-dependent clipping aperture may be used. According to another embodiment, a lens system, referred to as an achromatic corrector, may be used to produce differing NAs. Both embodiments may be designed to allow a single wavelength-balanced top hat converter lens to be used. When used in combination, a beam shaping optical element (e.g., a top hat converter lens) may be referred to as a first optical element, and a NA corrector (e.g., a wavelength dependent clipping aperture, a polarization dependent clipping aperture, or an achromatic corrector) may be referred to as a second optical element. As will be realized each of the first optical element and the second optical element may itself be comprised of plural optical elements.

Figure 8:
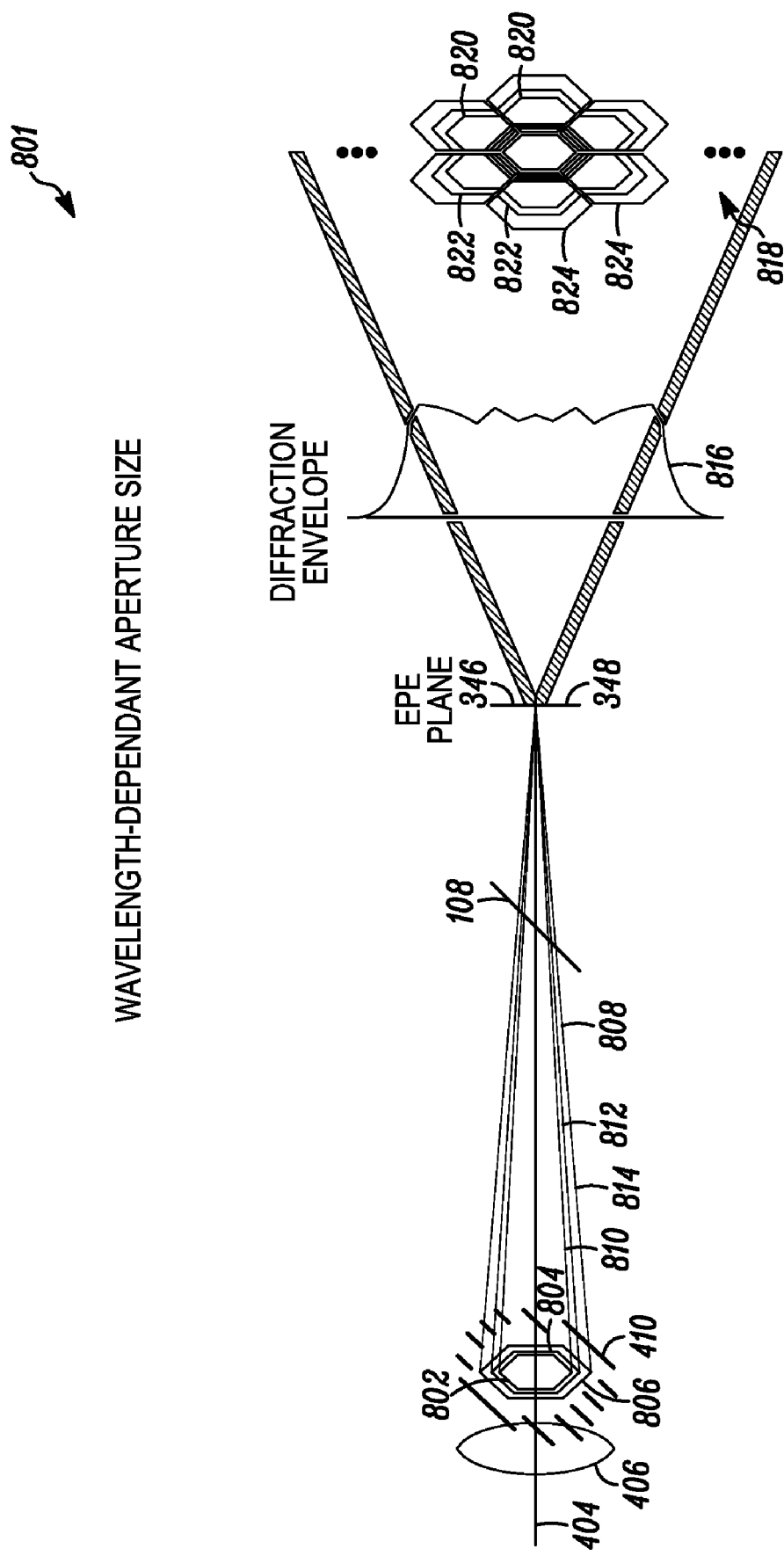
FIG. 8 is a side conceptual diagram illustrating some principles related to a wavelength-dependent aperture according to an embodiment.

FIG. 8 is a side conceptual diagram illustrating some principles related to a system 801 having a wavelength-dependent clipping aperture according to an embodiment. A composite input beam 404 may propagate through a first optical element 406 and then through a wavelength dependent clipping aperture 410. The wavelength dependent clipping aperture has a small aperture 802 configured to clip a short wavelength component of the composite beam, a medium-size aperture 804 configured to clip a medium wavelength component of the composite beam, and a large aperture 806 configured to clip a long wavelength component of the composite beam. The short wavelength component, medium wavelength component and long wavelength component may be blue, green, and red, respectively. The clipping aperture 410 thus produces a composite beam 808, here illustrated as a focused composite beam, having differing diameters for the wavelength components. The term diameter is referred to generically—the cross section of the wavelength components may, for example be hexagonal, square, rectangular, or another shape and may convolve as they propagate. For example, the short wavelength component has a small diameter 810, the medium wavelength component has a medium diameter 812, and the long wavelength has a large diameter 808. According to an embodiment, the diameters are proportional to one another according to the proportionality of the wavelengths.

The beam impinges on a beam scanner 108 and is scanned across an EPE 348 located at a focal plane 346, for example. The EPE; which may for example include a diffractive optical element (DOE), a microlens array (MLA), a dual microlens array (DMLA), a reflective microlens array, or other embodiment; diffracts the beam to produce a diffractive envelope 816 and an array of beamlets 818 at a viewing region in the far field. Short wavelength beamlets 820 have relatively small separation distances, and also have proportional small beamlet diameters produced as a result of the small clipping aperture 802, to produce a short wavelength fill factor of about one. Medium wavelength beamlets 822 have medium separation distances, and also have proportional medium beamlet diameters produced as a result of the medium clipping aperture 804 to produce a medium wavelength fill factor of about one. Long wavelength beamlets 824 have large separation distances, and also have proportional large beamlet diameters produced as a result of the large clipping aperture 806 to also produce a long wavelength fill factor of about one. Thus a relatively uniform power density is produced in the viewing region for each of the wavelengths.

As illustrated, one may notice that the longer wavelength beamlets are produced around the edges of the beamlet array 818. According to some embodiments, this may lead to color fringing around the edges of the exit pupil. According to other embodiments, for example, embodiments using an MLA or especially a DMLA, the number of rows and columns of beamlets produced at longer wavelengths are reduced such that the angular extent of the beamlet array 818 is substantially constant between the wavelengths. That is, a greater number of blue beamlets 820 are produced than red beamlets 824, the spacing between the blue beamlets being smaller, but the total angular extent of the blue and red beamlets 820, 824 being substantially equal.

While the clipping aperture 410 and EPE 348 are illustrated producing a hexagonal array 818 of hexagonal beamlets, alternative shapes are possible.

Figure 9:
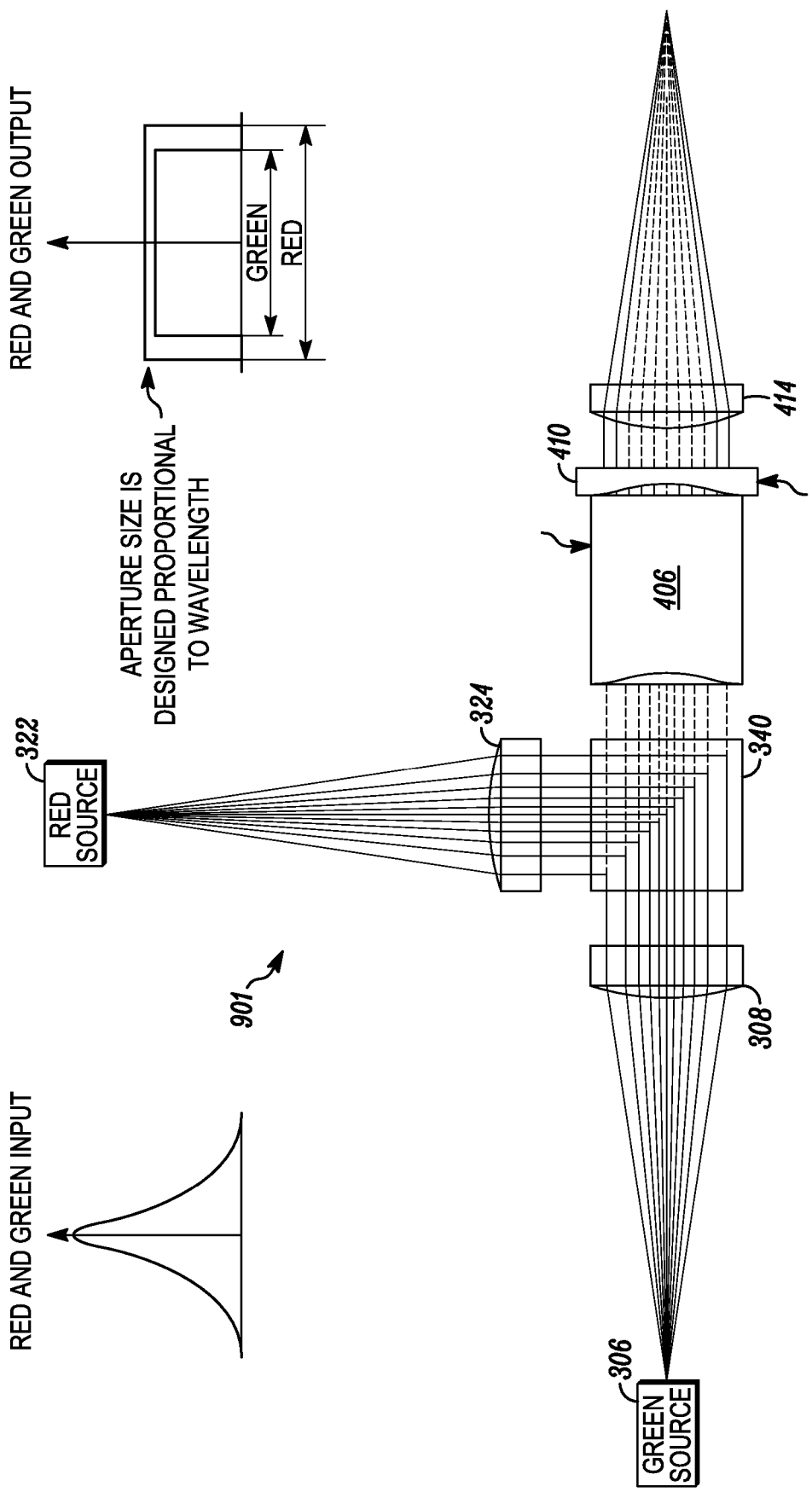
FIG. 9 is a schematic diagram of a light source module according to an embodiment made using a wavelength-dependent clipping aperture.

FIG. 9 is a schematic diagram of a light source module according to an embodiment made using a wavelength-dependent clipping aperture. The components of FIG. 9 correspond to portions of FIG. 4, with the beam scanner and EPE omitted. Thus the components of FIG. 9 may be used to form a light source module (LSM) 901 configured to produce an output beam that may have a constant angle, or may be combined with a separate scanner to produce a scanned beam source.

Figure 10:
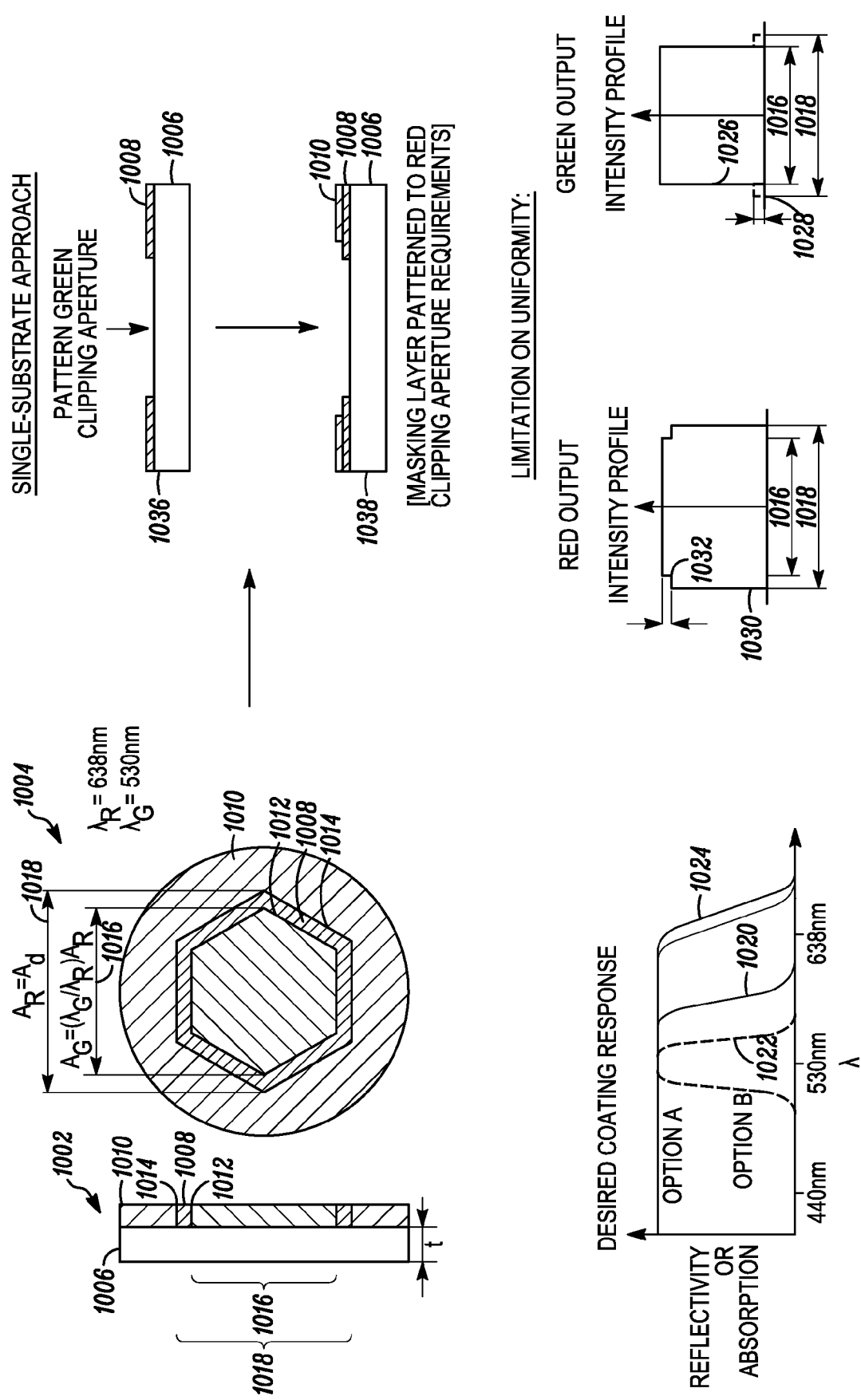
FIG. 10 illustrates several aspects of a wavelength-dependent clipping aperture according to embodiments.

FIG. 10 illustrates several aspects of a wavelength-dependent clipping aperture according to embodiments. Side-sectional and cross-sectional diagrams, 1002 and 1004, respectively, illustrate a wavelength-dependent clipping aperture having superimposed wavelength-dependent hexagonal clipping apertures. The wavelength-dependent clipping aperture may be formed on a substrate 1006 having a thickness t. A region 1008 of material and a region 1010 of material are formed concentrically. The inner edges of the material 1008 form a first clipping aperture 1012 having a first dimension 1016 and configured to pass light comprising a first optical property. The inner edges of material 1010 form a second clipping aperture 1014 having a second dimension 1018 and configured to pass light comprising a second optical property.

For example, the first optical property may comprise light having green or red wavelengths. The second optical property may comprise light having a red wavelength. Thus the first material 1008 may be opaque or reflective to all wavelengths shorter than red (or other alternative longest wavelength), but substantially pass red wavelengths, as indicated by the coating response curve 1020. Alternatively, the first material 1008 may be opaque or reflective to just green wavelengths (or other alternative shorter wavelength), as indicated by the dotted coating response curve 1022. The second material 1010 may be opaque or reflective to red and green wavelengths (or alternatively all wavelengths), as indicated by the coating response curve 1024.

Alternatively, the first optical property may include all polarizations and the second optical property may include a polarization not corresponding to a shorter wavelength used in the system.

Practically speaking, the coatings may not provide perfect cutoffs between wavelengths. For example, while an ideal cross-sectional top hat intensity curve of a shorter wavelength (e.g., green) may be characterized by the solid curve 1024 having a dimension 1016, an actual system may include some amount of intensity 1028 beyond the dimension 1016 and extending to the dimension 1018 caused by leakage through the material 1008. Similarly, an actual cross-sectional top hat intensity curve 1030 of a longer wavelength may include degradation of intensity 1032 at the edges corresponding to some attenuation of the longer wavelength between dimensions 1016 and 1018 by the material 1008. In a scanned beam display system using an EPE, such non-idealities may be characterized by some amount of non-uniformity of brightness in the far field as the viewer moves between beamlets in the viewing region.

A fabrication approach to a wavelength-dependent clipping aperture may be seen in the process diagram 1034 of FIG. 10. In a first step 1036, a substrate 1006 is masked and a first coating material 1008 is applied. Alternatively, the material 1008 may be applied, such as by spin-coating, and subsequently selectively cured or etched off. In a second step 1038, the substrate 1006 is then masked and the second material 1010 applied over the first material 1008. Alternatively, the coatings may be applied to separate substrates and the substrates sandwiched together or otherwise assembled in a system to hold them at a desired relationship to one another. Alternatively, the coatings may be applied to opposite sides of a substrate. Other alternatives will be apparent to those skilled in the art.

Several material technologies may be used to form the coatings 1008 and 1010. For example, a high rejection thin film, or HRF, a rugate thin film, a dichroic thin film, a conventional color filter such as a gel filter, and/or a notch filter may be used to make wavelength-dependent selection. Additionally, various bulk material approaches may be used to provide a totally opaque material, such as to form the long wavelength aperture. Alternatively, polarized light sources may be used in combination with materials such as a polarizing film, a reflective polarizing film, a polarization rotator, a quarter-wave plate, a polarization rotator combined with a polarizer, and/or a directional coupler may form one or more of the materials 1008 and 1010. Wavelength-selective and polarization-selective materials may further be combined. Of course, an additional number and/or different range of wavelengths may be accommodated using the approaches taught herein.

A range of patterning technologies may be used including, but not limited to, photolithography, ink-jet printing, pad printing, selective curing such as UV, EB, or two-photon curing, punching, cutting, and other technologies.

Figure 11:
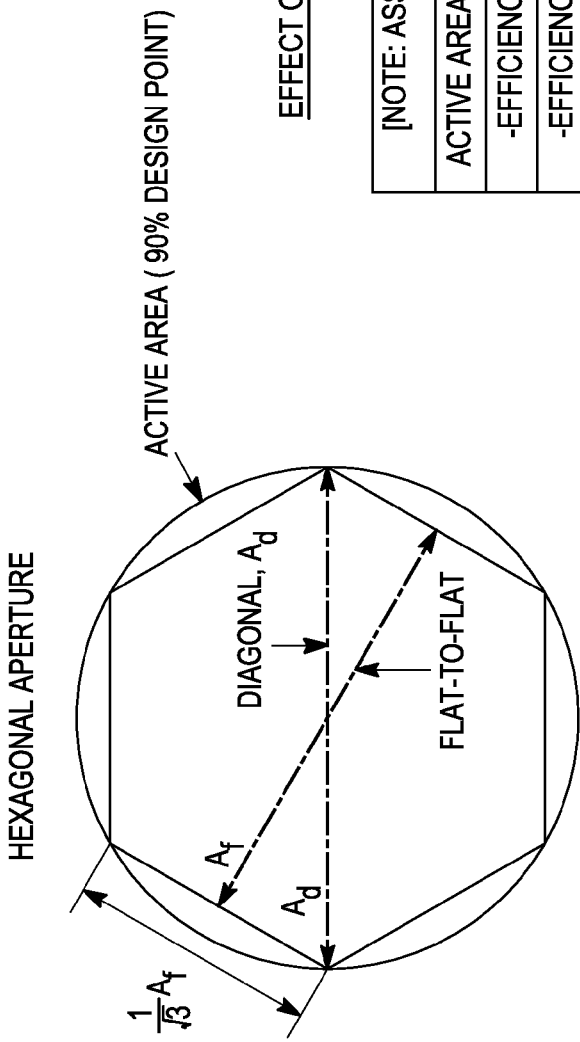
FIG. 11 illustrates methods of calculating efficiencies for two wavelengths transmitted through a wavelength clipping aperture and shows calculated efficiencies according to embodiments.

FIG. 11 illustrates methods of calculating efficiencies for two wavelengths transmitted through a wavelength clipping aperture and shows calculated efficiencies according to embodiments.

Some advantages for a wavelength-dependent clipping aperture according to embodiments include the use of a single, common top hat converter lens for both the red and green channels. As mentioned above, this may yield improvements in cost, size, weight, manufacturability including calibration, etc. However, there may be some efficiency loss incurred for the green channel because of greater beam clipping. Furthermore, there may be uniformity limits on the red channel due to coating absorption effects of the green aperture coating.

As mentioned above, another approach to providing wavelength dependent clipping may be to use polarization effects. For example the green light may be provided at a first polarization with the green aperture formed from a polarizer (analyzer) oriented to reject polarizations corresponding to the first polarization. The red light may be provided at a second orthogonal polarization that is substantially unaffected by the green aperture. The red aperture may then be formed from a normal opaque material, or alternatively may be formed from a polarizer oriented to reject polarizations corresponding to the second polarization.

Figure 12:
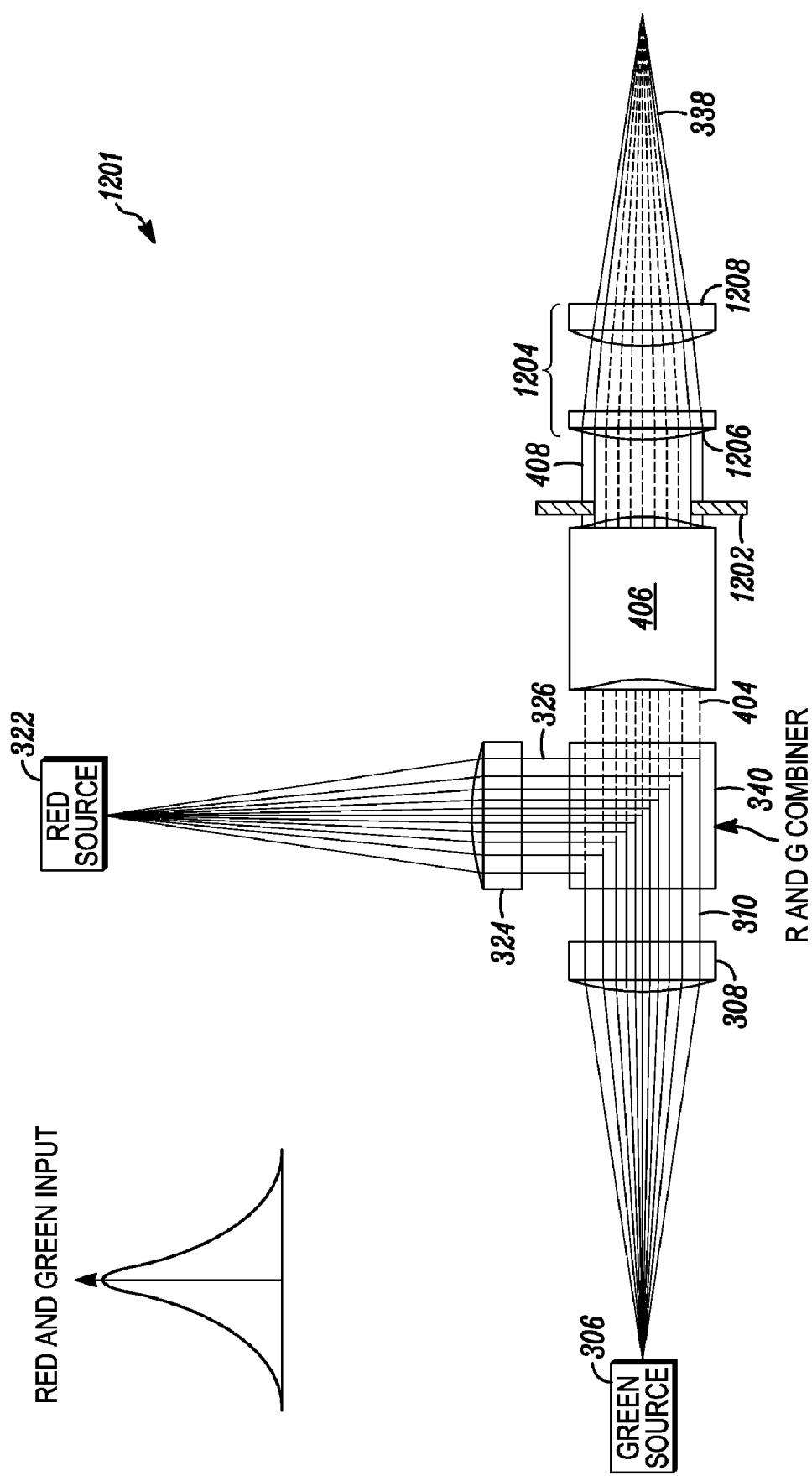
FIG. 12 is a schematic diagram of a light source module according to an embodiment made using a diffraction achromatic corrector.

As mentioned above, a second approach to providing corrected NAs for the various wavelengths scanned across the EPE includes providing a correction lens or lens system referred to as an achromatic corrector. FIG. 12 is a schematic diagram of a light source module 1201 according to an embodiment made using an achromatic corrector. The components of FIG. 12 correspond to portions of FIGS. 4 and 9, with the beam scanner and EPE omitted, and an achromatic corrector substituted for the polarization-dependent clipping aperture.

A two channel light source module 1201 may include a green laser light source 306 operable to emit a beam of green light through a green collimating lens 308 to produce a green collimated beam 310. Similarly, the two channel light source module 1201 may include a red laser light source 322 operable to emit a beam of red light through a red collimating lens 324 to produce a red collimated beam 326. The green and red collimated beams 310, 326 may be combined by a beam combiner 340 to produce a collimated composite beam of light 404 comprised of green and red wavelength components. Beam shaping optics 406 may then shape the received beam. For example, the beam shaping optics may comprise a top hat converter configured to redistribute the power density profile of the composite beam 404 from a substantially Gaussian profile to an output beam 408 having a substantially top-hat profile. In the embodiment 1201, the beam shaping optic may be designed to be substantially pan-chromatic to convert the energy distribution of the differing wavelength components of the composite beam 404 into energy distributions within the output beam 408 that are substantially similar to one another.

The composite beam 408 may then be passed through a broad spectrum clipping aperture 1202 to form clipped beam 408 having substantially equal dimensions among the red and green wavelength components. An achromatic corrector 1204 is configured to impart differing diameters on the wavelength components of the composite beam.

The achromatic corrector 1204 is shown comprised of two lenses 1206, 1208 that cooperate to change the relative dimensions of wavelength components of the composite beam 408 and focus the composite beam to a desired point (not shown). For example, the achromatic converter 1204 may be configured to impart diameters of the wavelength components that are proportional to wavelength.

For example, for a green wavelength of 532 nanometers and a red wavelength of 635 nanometers, the achromatic corrector may impart a dimension on the red wavelength component that is about 1.19 times the diameter of the green wavelength component (635/532=~1.19).

The focused composite output beam 338 may then be used to form various systems such as a scanned beam source analogous to that of FIG. 4 and elsewhere herein. According to an alternative embodiment, the achromatic corrector may be formed as a single lens or as a plurality of lenses.

Figure 13:
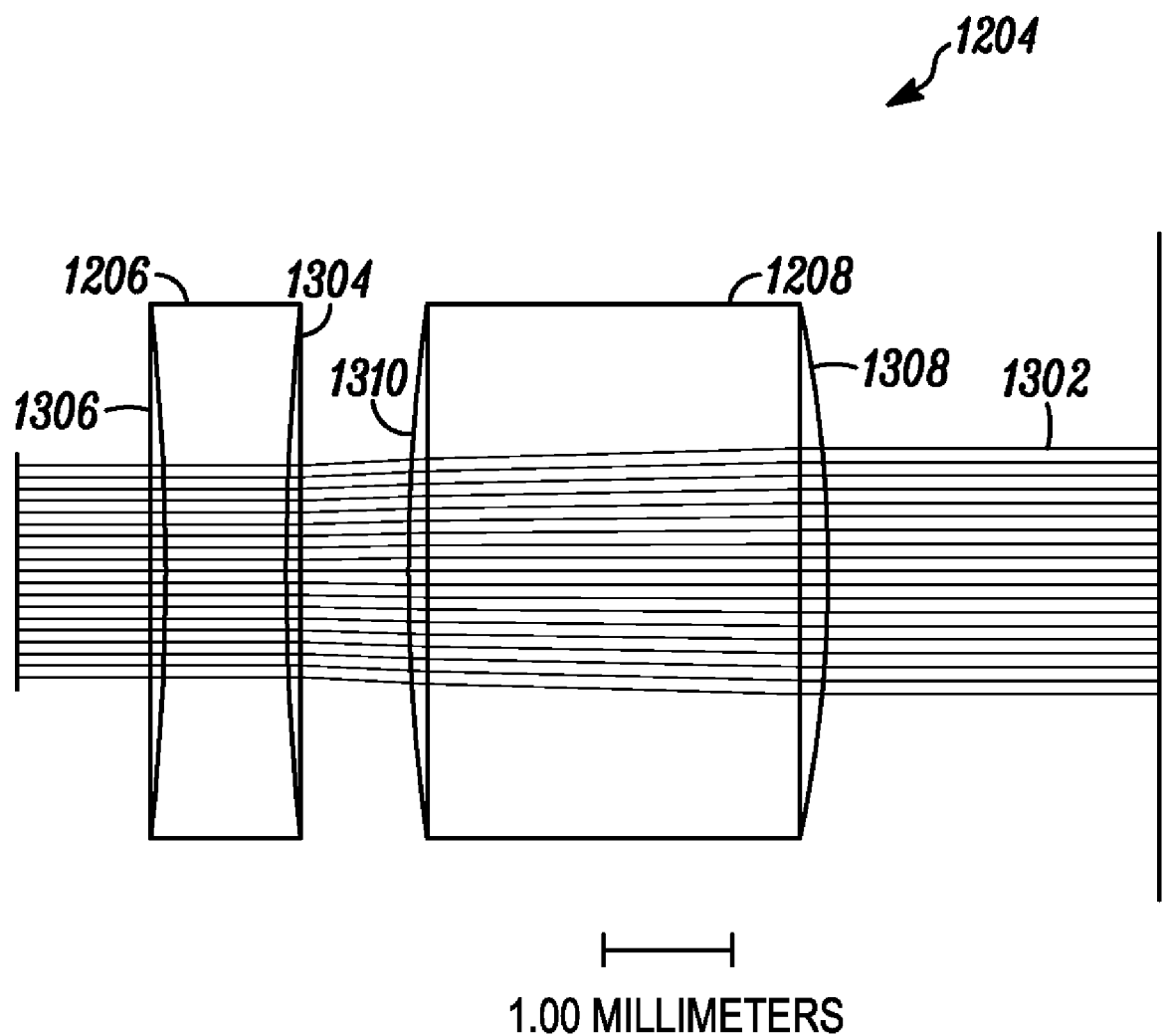
FIG. 13 is a diagram of a corrector doublet including ray traces for two colors according to an embodiment.

FIG. 13 is a diagram of an achromatic corrector doublet 1204 comprising two elements 1206 and 1208 including ray traces 1302 for two colors according to an embodiment. The air-spaced doublet 1204 includes spherical diffraction surfaces. The first element 1206 includes two surfaces 1304 and 1306 whose radii are given as R1 and R2, respectively for Lens 1 in FIG. 14. The second element 1208 includes two surfaces 1308 and 1310, respectively, whose radii are given as R1 and R2 for Lens 2 in FIG. 14. The materials and focal length are as indicated.

Figure 15:
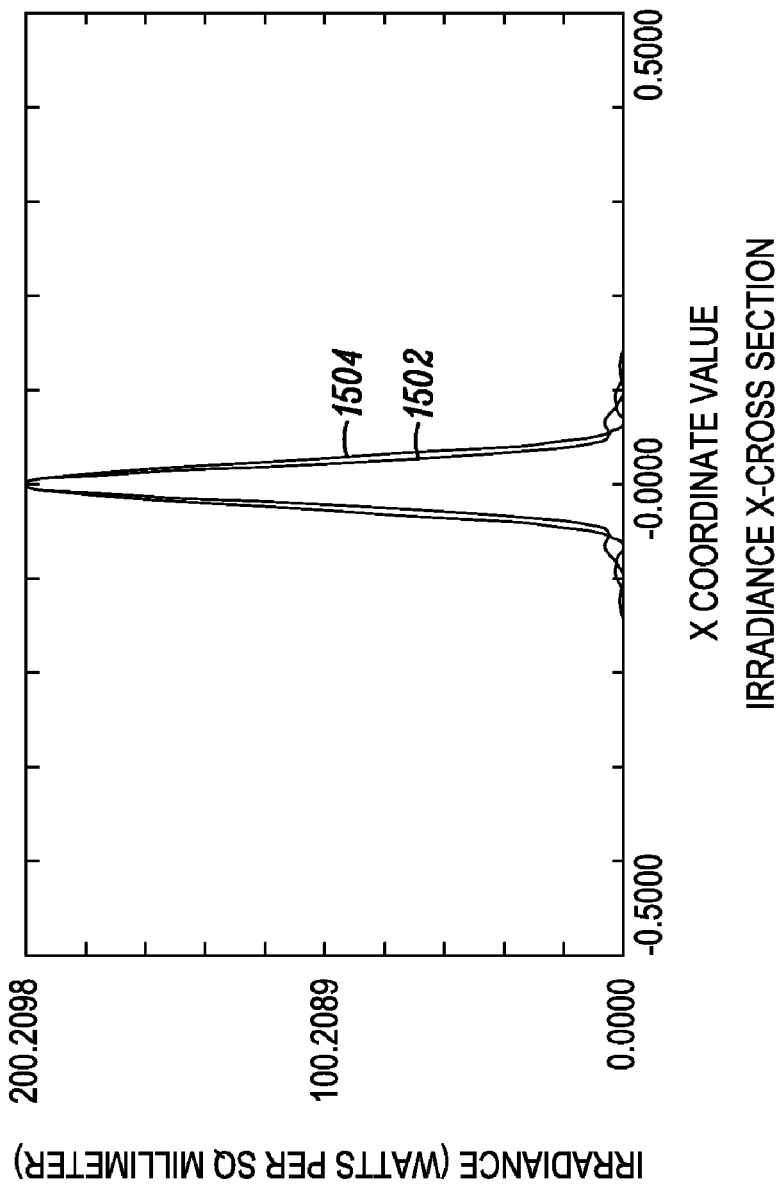
FIG. 15 is a plot of beam power vs. axial displacement for red and green spots produced by the system of FIG. 12 according to an embodiment.

FIG. 15 is a plot of beam power vs. axial displacement, 1502 and 1504, for green and red spots respectively, produced by the system of FIG. 12 according to an embodiment. The plot is taken at the plane of an exit pupil expander, and hence the power distribution follows a sinc function, the function that a top-hat function convolves to as it propagates. The difference between red and green spot sizes is about 5 µm, according to the embodiment.

Compared to embodiments using a color-dependent aperture, the relative efficiencies of the wavelength components may be substantially equal because the wavelength components are not clipped differentially to create the different wavelength component dimensions. In other words, according to some embodiments, green has substantially the same efficiency as red, because a standard aperture may be used.

As is known to the art, the sinc function may subsequently convolve back to a top hat beam shape as it reaches a second plane. According to some embodiments, the focal length of the top hat corrector may be designed to produce a top hat function at the viewing depth of the scanned beam display. Similarly, a scanned beam image capture system may similarly use a beam designed as a sinc distribution at one working distance and a top hat distribution at a second, longer working distance.

Figure 16:
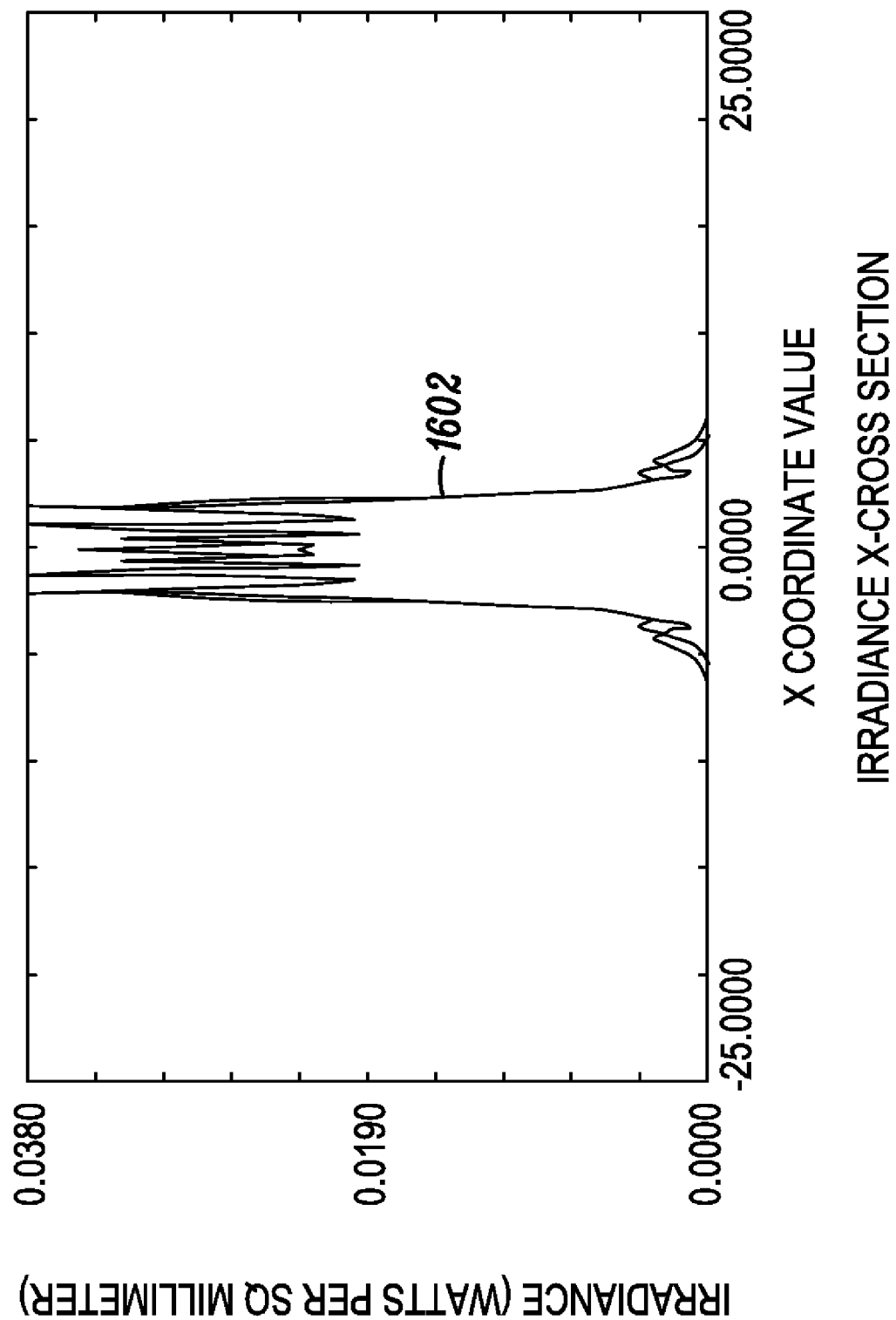
FIG. 16 is another plot of beam power vs. axial displacement for red and green spots produced by the system of FIG. 12 according to an embodiment.

FIG. 16 is a plot of beam power vs. axial displacement for red and green beamlet arrays that was produced by the system of FIG. 12 and scanned over an EPE similar to the system of FIGS. 4 and 8, according to an embodiment.

The preceding overview, brief description of the drawings, and detailed description describe exemplary embodiments according to the invention in a manner intended to foster ease of understanding by the reader. Other structures, methods, and equivalents may be within the scope of the invention. As such, the scope of the invention described herein shall be limited only by the claims.

What is claimed is:

1. A scanned beam source comprising:
   a light generator operable to generate a composite beam of light comprising a first plurality of wavelength components;
   a first beam shaping optical element aligned to receive the composite beam of light from the light generator;
   a second beam shaping optical element aligned to receive the composite beam of light from the first beam shaping optical element and configured to modify the first plurality of wavelength components of the composite beam to a second plurality of dimensions proportional to wavelength;
   a beam scanner aligned to receive the composite beam from the second beam shaping optical element and operable to scan the composite beam in a periodic pattern; and an exit pupil expander aligned to receive the scanned composite beam from the beam scanner and configured to project an expanded composite beam into a viewing region, wherein the second plurality of dimensions are selected to cooperate with the exit pupil expander to reduce an intensity non-uniformity in the viewing region compared to a scanned beam source lacking the second optical element.

2. The scanned beam source of claim 1 wherein the light generator further comprises:
   a third plurality of light sources operable to produce respective beams of light at the first plurality of wavelengths; and
   a beam combiner aligned to receive the beams of light from the third plurality of light sources and configured to combine the plurality of received beams of light into a composite beam of light containing the first plurality of wavelength components.

3. The scanned beam source of claim 2 wherein the third plurality equals the first plurality.

4. The scanned beam source of claim 1 wherein the second plurality equals the first plurality.

5. The scanned beam source of claim 1 wherein the first beam shaping optical element comprises a top-hat converter configured to convert the received composite beam from a Gaussian intensity profile to a top hat shaped intensity profile.

6. The scanned beam source of claim 5 wherein the first beam shaping optical element comprises a top-hat converter lens.

7. The scanned beam source of claim 5 wherein the first beam shaping optical element comprises a multi-element top-hat converter.

8. The scanned beam source of claim 1 wherein the second beam shaping optical element comprises a wavelength-selective clipping aperture.

9. The scanned beam source of claim 8 wherein the second beam shaping optical element comprises a pattern of wavelength-selective regions configured to selectively transmit wavelengths of light.

10. The scanned beam source of claim 8 wherein the second beam shaping optical element comprises a pattern of polarization-sensitive regions configured to selectively transmit polarizations of light.

11. The scanned beam source of claim 1 wherein the plurality of dimensions comprises a plurality of beam diameters.

12. The scanned beam source of claim 1 wherein the second beam shaping optical element comprises an achromatic corrector.

13. The scanned beam source of claim 12 wherein the second beam shaping optical element comprises a multi-element lens set.

14. The scanned beam source of claim 12 wherein the second beam shaping optical element comprises a single aspheric lens.

15. The scanned beam source of claim 1 wherein the second plurality of dimensions corresponds to a second plurality of numerical apertures.

16. The scanned beam source of claim 1 further comprising:
   a controller operably coupled to the light generator and operable to receive a video image and modulate the intensity of the first plurality of wavelength components generated by the light generator in a temporal pattern corresponding to the received video image.

17. A method for producing a viewable image comprising:
   generating a composite beam of light comprising a first plurality of wavelength components;
   modifying the diameters of the first plurality of wavelength components of the composite beam corresponding to wavelength to produce an output beam;
   scanning the output beam in a periodic pattern to produce a scanned beam; and
   expanding the exit pupil of the scanned beam with an exit pupil expander to produce an expanded exit pupil at a viewing region, wherein the diameters of the wavelength components cooperate with the exit pupil expander to smooth intensity variations within the viewing region.

18. The method for producing a viewable image of claim 17 wherein the modified diameters are proportional to wavelength.

19. The method for producing a viewable image of claim 17 wherein modifying the diameters comprises modifying the diameters to a second plurality of diameters.

20. The method for producing a viewable image of claim 19 wherein the first plurality equals the second plurality.

21. The method for producing a viewable image of claim 19 wherein the first plurality is greater than the second plurality.

22. The method for producing a viewable image of claim 17 further comprising modifying the energy distribution envelope of the composite beam of light prior to modifying the diameters.

23. The method for producing a viewable image of claim 22 wherein modifying the energy distribution envelope comprises modifying the energy distribution of the composite beam from a Gaussian intensity profile to a top hat shaped intensity profile.

24. The method for producing a viewable image of claim 17 wherein generating the composite beam of light further comprises:
   driving a third plurality of light sources to produce respective beams of light at the first plurality of wavelengths; and
   combining the beams from the third plurality of light sources into a composite beam of light containing the first plurality of wavelength components.

25. The method for producing a viewable image of claim 23 wherein the third plurality equals the first plurality.

26. The method for producing a viewable image of claim 17 wherein the diameters are modified by a wavelength-selective clipping aperture.

27. The method for producing a viewable image of claim 17 wherein the diameters are modified by a polarization-selective clipping aperture.

28. The method for producing a viewable image of claim 17 wherein the diameters are modified by an achromatic corrector.

29. The method for producing a viewable image of claim 17 further comprising:
   receiving a video image; and
   wherein generating the composite beam of light comprises modulating the intensities of the wavelength components according to the video image.

30. A wavelength-dependent clipping aperture comprising:
   a first clipping aperture having a first dimension configured to pass light having a first optical property; and
   a second clipping aperture having a second dimension different than the first dimension, superimposed over the first aperture and configured to pass light having a second optical property, wherein the second optical property comprises a second polarization and the first optical property comprises a first polarization plus the second polarization.

31. The wavelength-dependent clipping aperture of claim 30 wherein the first polarization comprises a first plane polarization and the second polarization comprises a second plane polarization ninety degrees from the first plane polarization.

* * * * *